United States Patent [19]

Hsu

[11] Patent Number: 5,281,043
[45] Date of Patent: Jan. 25, 1994

[54] MECHANICAL COUPLING DEVICE

[76] Inventor: Li J. Hsu, 1F, No.9-2, Lane 128, Sec. 1, Shih Pai Rd., Taipei, Taiwan

[21] Appl. No.: 964,161

[22] Filed: Oct. 21, 1992

[51] Int. Cl.⁵ ............................ F16B 2/10; F16B 2/24
[52] U.S. Cl. .................................. 403/300; 403/291; 403/368; 403/374
[58] Field of Search ............... 403/373, 374, 300, 372, 403/291, 368

[56] References Cited

U.S. PATENT DOCUMENTS

| | | | |
|---|---|---|---|
| 567,193 | 9/1896 | Nash | 403/368 |
| 1,270,976 | 7/1918 | Schade | 403/368 |
| 4,261,211 | 4/1981 | Haberland | 403/291 |
| 4,286,370 | 9/1981 | Craig | 403/291 |

Primary Examiner—Richard K. Seidel
Assistant Examiner—Erik R. Puknys
Attorney, Agent, or Firm—Lowe, Price, LeBlanc & Becker

[57] ABSTRACT

A mechanical coupling device includes a spring retainer wound up around two tie rods inside a housing, a driving device supported on a bearing plate above the spring retainer and having an axle extended out of the housing through a center hole. Inserting a rod member through an opening on the housing into openings on two side sections and an intermediate section of the spring retainer causes locating spring leaves on the spring retainer to be spread out to hold the rod member firmly fastened. Rotating the axle of the driving device in one direction causes the spring retainer to be contracted in moving back the locating spring leaves and releasing the rod member; rotating the axle of the driving device in the reversed direction causes the locating spring leaves to be spread out to hold the rod member being inserted firmly fastened.

12 Claims, 21 Drawing Sheets

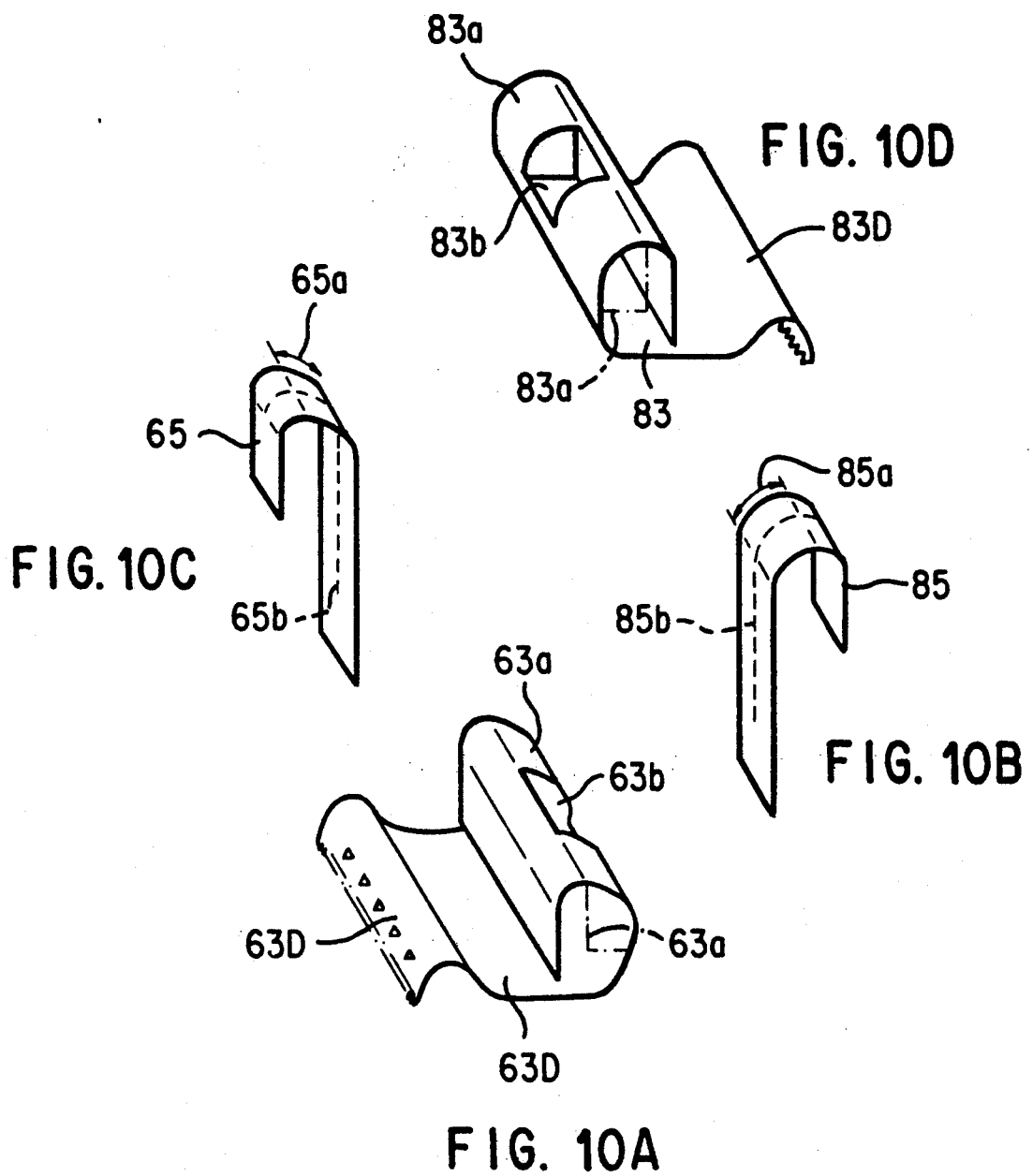

MECHANICAL COUPLING DEVICE

BACKGROUND OF THE INVENTION

The present invention relates to coupling devices and relates more particularly to a mechanical coupling device adapted to couple mechanical parts together.

Bolts and nuts are commonly used in a variety of industries for connecting mechanical parts together. However, it takes time to fasten or unfasten a bolt or nut, and a special tool may be required when turning a bolt or nut with the hand. Furthermore, a bolt or nut may be loosened from position as the mechanical parts joined thereby are vibrated, or stuck in place when it is covered with rust.

SUMMARY OF THE INVENTION

The present invention eliminates the aforesaid problems. According to one aspect of the present invention, a mechanical coupling device is generally comprised of a housing consisted of a top cover and a hollow base fastened by two tie rods through rivet joints, a spring retainer made from a spring plate bent into a curved structure in a S-shaped cross section and wound up around the tie rods inside the housing, a bearing plate fastened to the tie rods inside the housing and supported on the spring retainer, and a driving device revolvably supported on the bearing plate inside the housing. Inserting a rod member through an opening on the housing into openings on two side sections and an intermediate section of the spring retainer causes locating spring leaves on the spring retainer to be spread out to hold the rod member firmly fastened. According to another aspect of the present invention, the driving device has an axle extended out of the housing through a center hole for turning with the hand by a tool. Rotating the axle of the driving device in one direction causes the spring retainer to be contracted in moving back the locating spring leaves and releasing the rod member; rotating the axle of the driving device in the reversed direction causes the locating spring leaves to be spread out to hold the rod member being inserted firmly fastened. The axle of the driving device may be made in any of a variety of shapes for turning with the hand by a screwdriver, a spanner or a socket wrench.

BRIEF DESCRIPTION OF THE DRAWINGS

FIGS. 10a-d are elevational views of the prongs and the locating spring leaves of the side sections;

DETAILED DESCRIPTION OF THE PREFERRED EMBODIMENT

Figure 1:
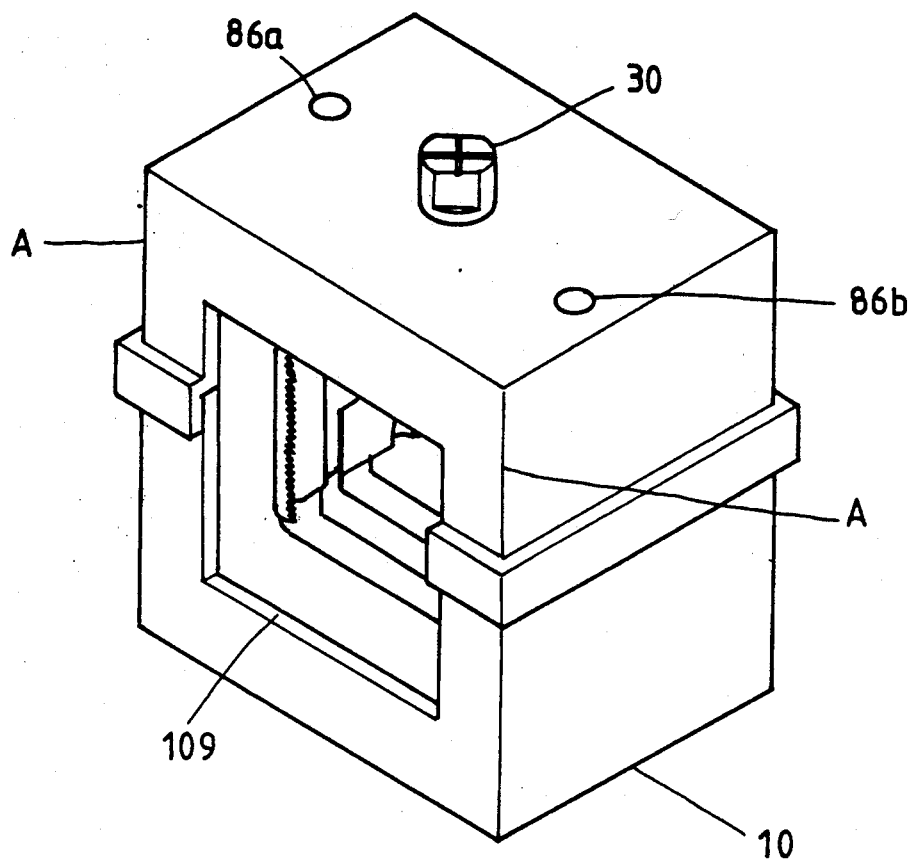
FIG. 1 is an elevational view of a mechanical coupling device embodying the present invention.
Figure 2:
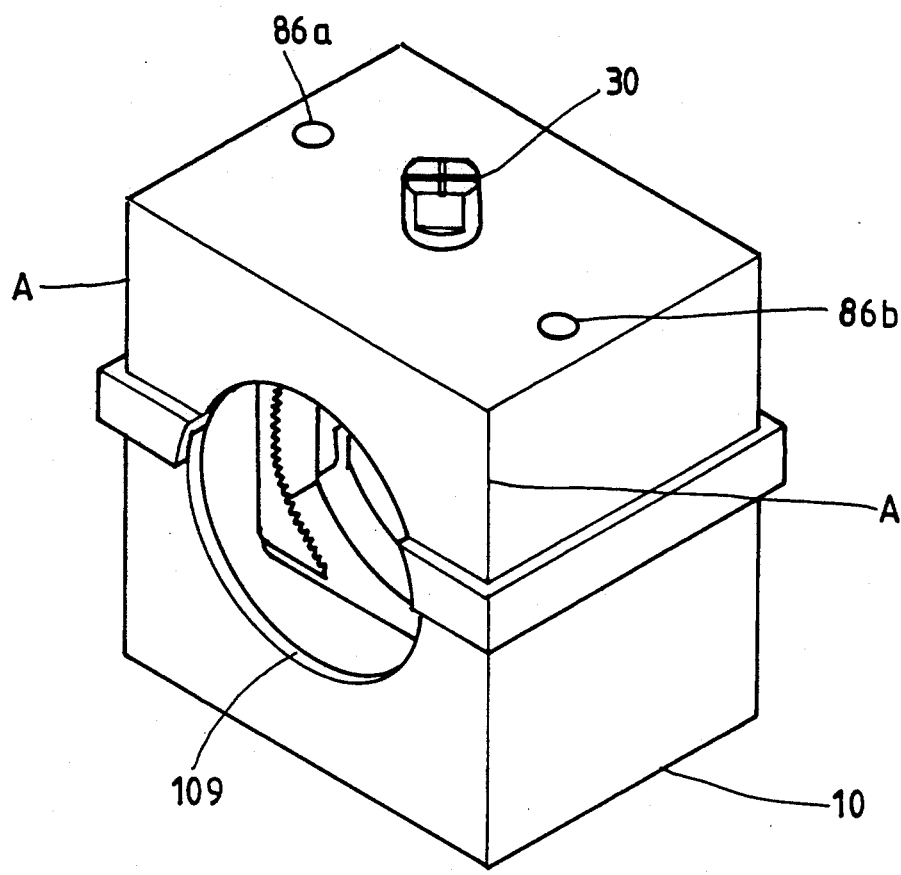
FIG. 2 is an elevational view of an alternate form of the mechanical coupling device.
Figure 3:
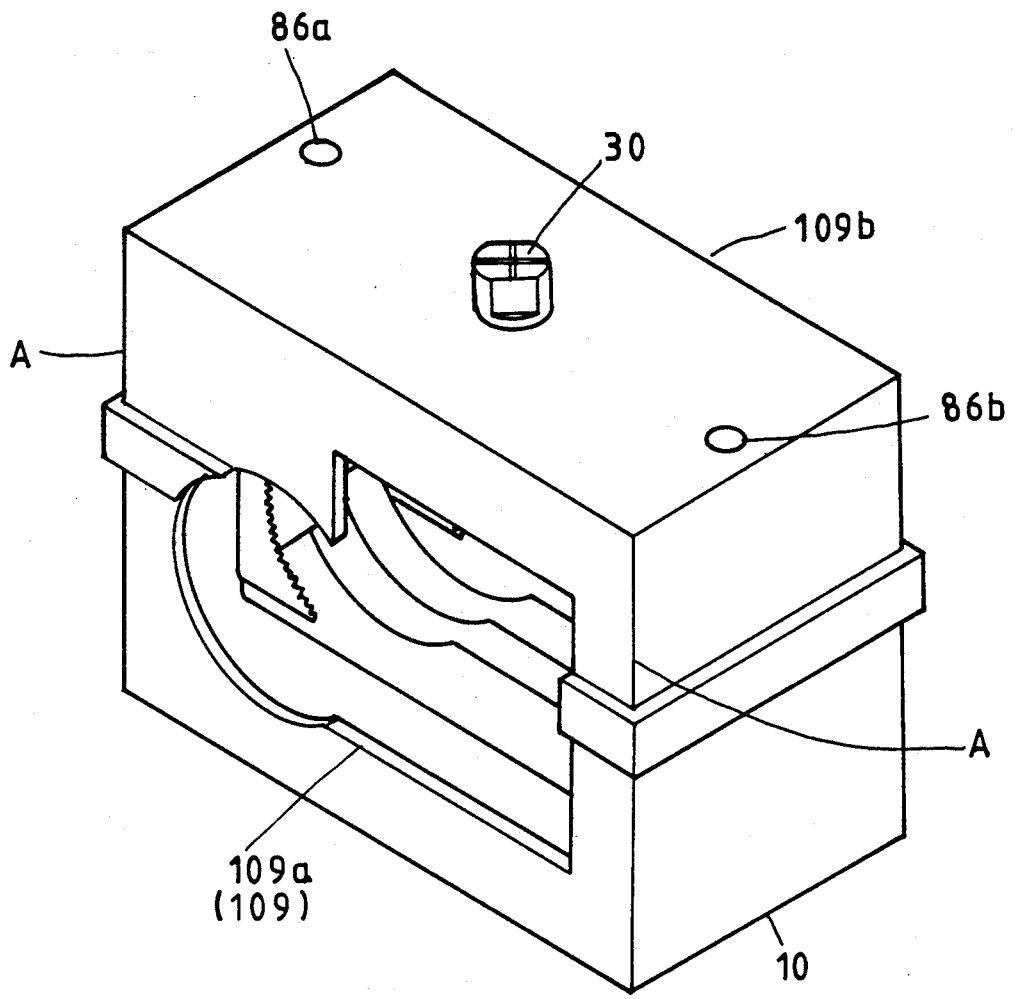
FIG. 3 is an elevational view of another alternate form of the mechanical coupling device.
Figure 4:
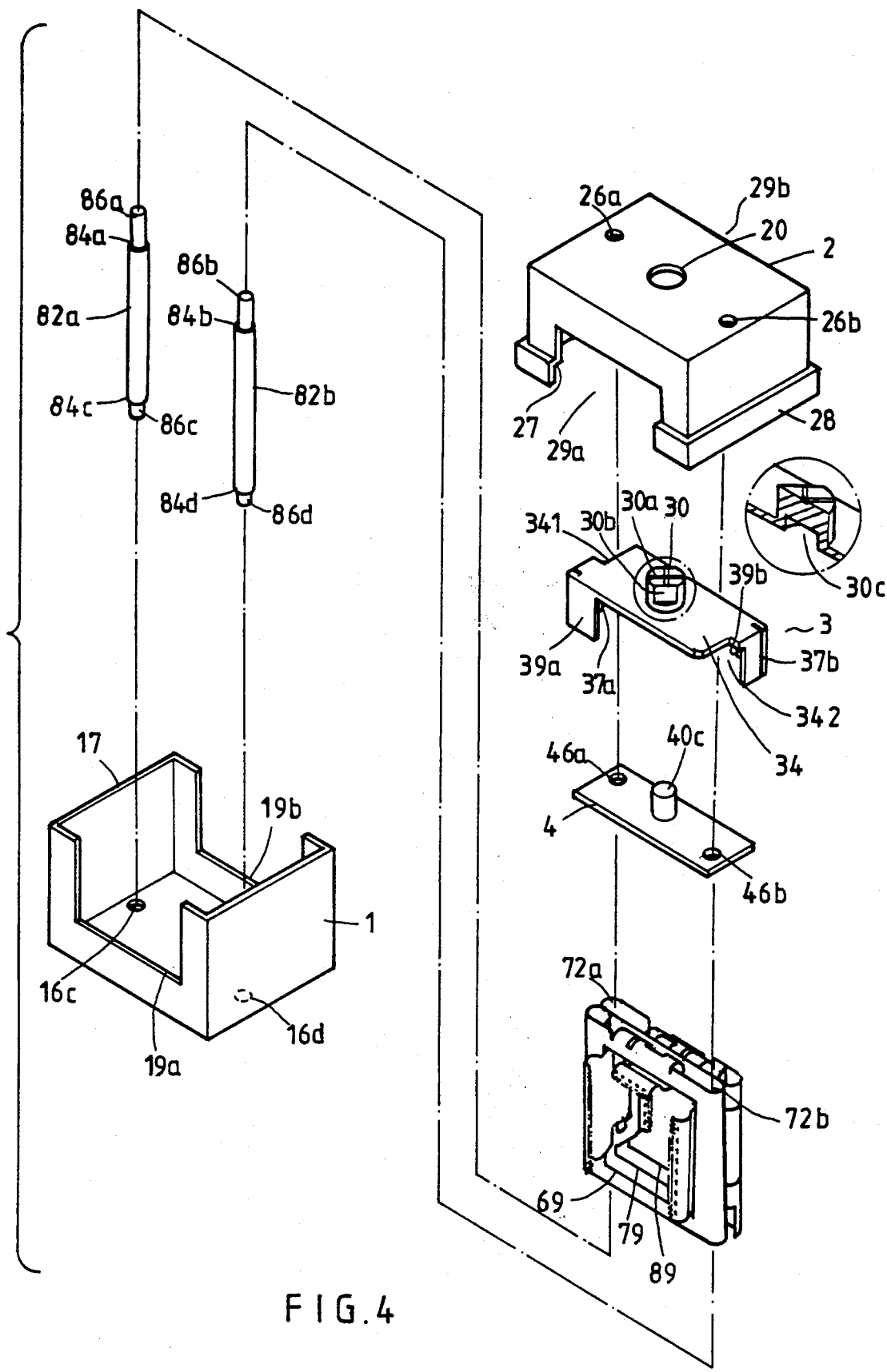
FIG. 4 is an exploded view of the mechanical coupling device of FIG. 1 in a contracted scale.
Figure 5:
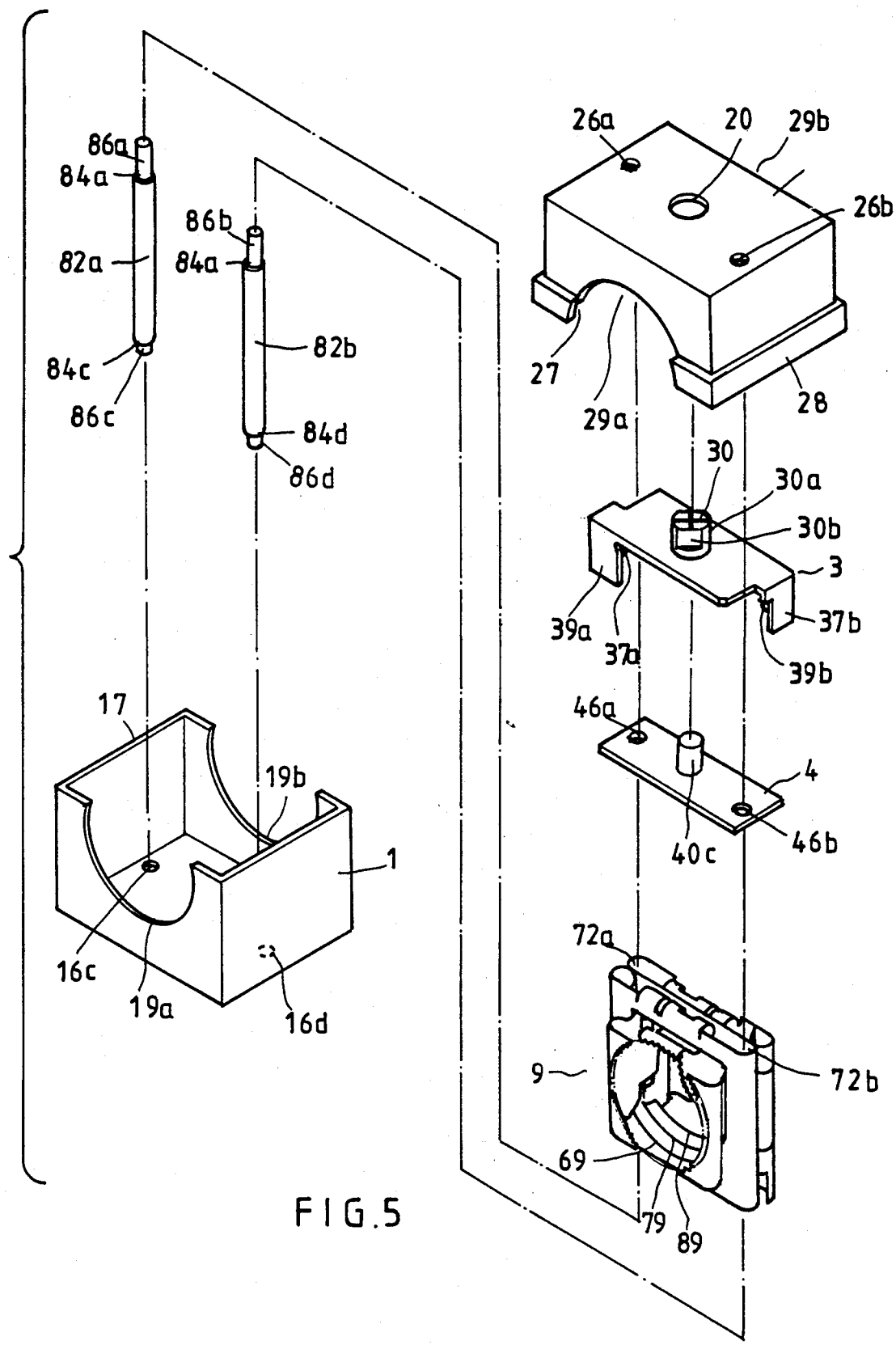
FIG. 5 is an exploded view of the mechanical coupling device of FIG. 2 in a contracted scale.

Referring to FIGS. 1, 2, 3, 4 and 5, a mechanical coupling device 10 as constructed in accordance with the present invention is generally comprised of a casing 1, a top cover 2, a driving device 3, a bearing plate 4, a spring retainer 9, and two tie rods 82a, 82b.

The top cover 2 covers on the casing 1 with a space defined on the inside for moving the other parts. The top cover 2 and the casing 1 are respectively formed of a thin sheet metal, each of which having two small holes 16c,16d;26c,26d spaced on a respective flat horizontal wall. The top cover 2 further has a center hole 20 between the small holes 26c, 26d, a bottom recess 27, which receives the peripheral topmost edge 17 of the casing 1, a bottom flange 28 surrounding the bottom recess 27 to hold the peripheral topmost edge 17 of the casing 1 on the inside. As the top cover 2 and the casing 1 are connected into an outer shell, an opening 109 is formed through the outer shell in horizontal direction. The opening 109 may be variously shaped. It may be made in either circular or rectangular shape, or divided into two or more holes according to the purpose of the mechanical coupling device.

The driving device 3 comprises an operating axle 30 raised from the center of a base plate 34 and extended out of the top cover 2 through the center hole 20 thereof. The operating axle 30 has a cross-shaped slot 30a on a top edge thereof for turning with the hand by a screwdriver, two symmetrical planes 30b on two opposite sides for turning with the hand by a spanner or the like, and a recessed axle hole 30c on a bottom edge thereof (namely, on the bottom edge of the base plate 34 at location below the operating axle 30). Of course, the operating axle 30 may made in the shape of a square or hexagonal rod for turning with the hand by a spanner or the like easily. The base plate 34 is made from a substantially rectangular plate, having two corner cuts, namely, the upper left corner cut 341 and the lower right corner cut 343 on two diagonal corners thereof, two symmetrical driving rods and two symmetrical actuating rods perpendicularly extended downwards from the two diagonal corners thereof, namely, the lower left driving rod 39a and the lower left actuating rod 36 spaced by a gap 37a at one corner and the upper right driving rod 39b and the upper left actuating rod 38 spaced by a gap 37b at an opposite corner.

The bearing plate 4 is made from a rectangular plate having two small holes 46a,46b adjacent to two opposite ends thereof and an upright stub axle 40c at the center. When assembled, the stub axle 40c of the bearing plate 4 is inserted into the recessed axle hole 30c on the driving device 3 for permitting the driving device 3 to be alternatively rotated back and forth on the stub axle 40c.

The spring retainer 9 is made from a spring plate bent into a curved structure in a S-shaped cross section consisted of an intermediate section 7 having two opposite ends formed into two bellies 72a, 72b, and two opposite side sections 6,8 respectively extended outwards and then inwards from the two bellies 72a, 72b of the intermediate section 7 in reversed directions. When installed, the side sections 6,8 of the spring retainer 9 are respectively inserted into the gaps 37a, 37b between the actuating rods 36,38 and the driving rods 39a, 39b (see FIG. 6), with the actuating rods 36,38 retained within the two side sections 6,8 and the driving rods 39a, 39b on the outside. Openings 79,69,89 are respective made through the intermediate section 7 and the side sections 6,8 disposed in line with the opening 109 on the outer shell formed of the casing 1 and the top cover 2 for inserting the rod members to be tied. Small locating spring leaves 63,67,83,87, 76,78 are respectively made on the side sections 6,8 and the two bellies 72a, 72b of the intermediate section 7 at suitable locations in suitable sizes, each of which is terminated into a toothed edge 63D, 67D, 83D, 87D, 76D, or 78D. Prongs 65,85 are respectively made on the side sections 6,8. As the rod members to be tied were inserted through the openings 109,79,69,89, the prongs 65,68 are squeezed to move the side sections 6,8 apart in extending out the locating spring leaves 63,67,76,78,83,87 for permitting the toothed edges 63D,67D,83D,87D,76D,78D to engage the rod members in holding them down. If the prongs 65,85 are not triggered as the rod members to be tied were inserted through the openings 109,79,69,89, the operating axle 30 may be rotated to drive the actuating rods 36,38 in extending out the side sections 6,8 of the spring retainer 9 for permitting the toothed edges 63D,67D,83D,87D,76D,78D to engage the rod members in holding them down.

The tie rods 82a, 82b are symmetrical and respectively attached to the bellies 72a, 72b of the intermediate section 7 of the spring retainer 9 on the inside, each having a thinner bottom extension rod 86c or 86D extended from a respective bottom edge 84 or 84D and inserted into either small hole 16c or 16d on the casing 1 and a thinner top extension rod 86a or 86b extended from a respective top edge 84a or 84b and inserted through either small hole 46a or 46b on the bearing plate 4 and extended out of the top cover 2 through either small hole 26a or 26b thereof. When installed, the bottom edge 84c or 84D and the top edge 84a or 84b of either tie rod 82a or 82b are respectively stopped against an inside surface of the casing 1 or the top cover 2. Of course, the top extension rod 86a or 86b and the bottom extension rod 86c or 86D may be directly made on two opposite ends of the tie rod 82a or 82b through the process of punching with a tapered surface formed between the body of the tie rod 82a or 82b and either extension rod, and therefore the top edge 84a or 84b and the bottom edge 84c or 84D can be eliminated without affecting the positioning of the respective tie rod 82a or 82b. When installed, the corner cuts 341,342 on the driving device 3 are respectively disposed around the top extension rods 86a, 86b of the tie rods 82a, 82b, and therefore the driving device 3 is allowed to be swiveled back and forth.

Figure 6:
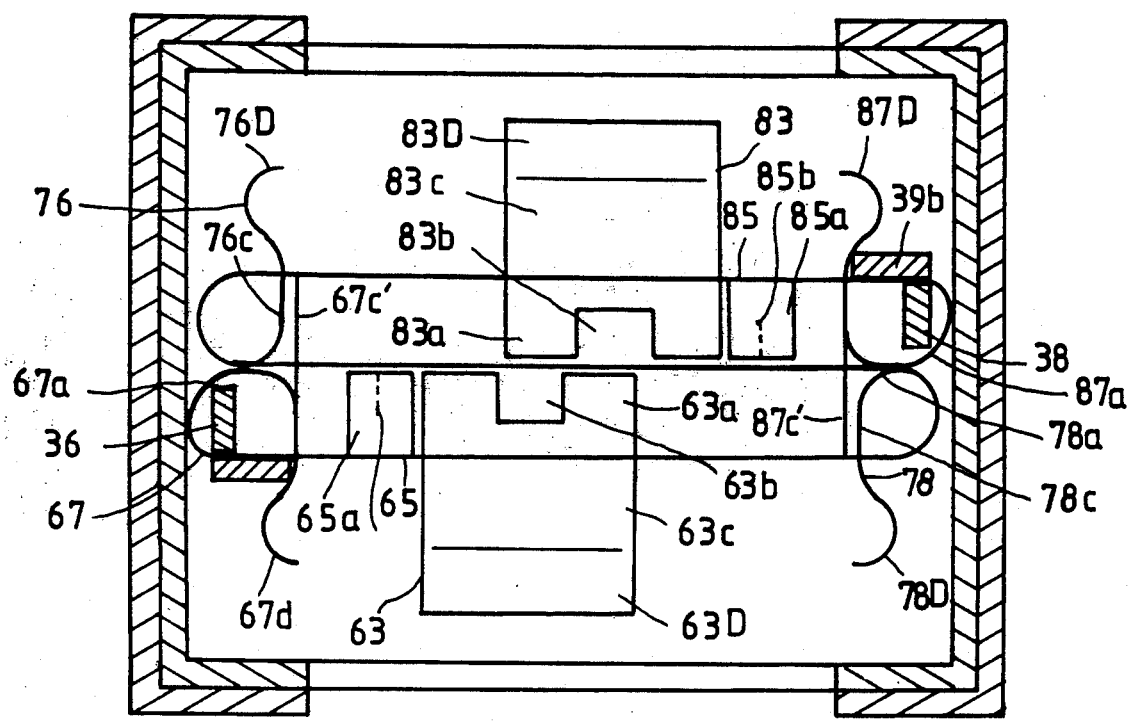
FIG. 6 is a cross section taken along line A—A of FIG. 1 or FIG. 2.
Figure 7:
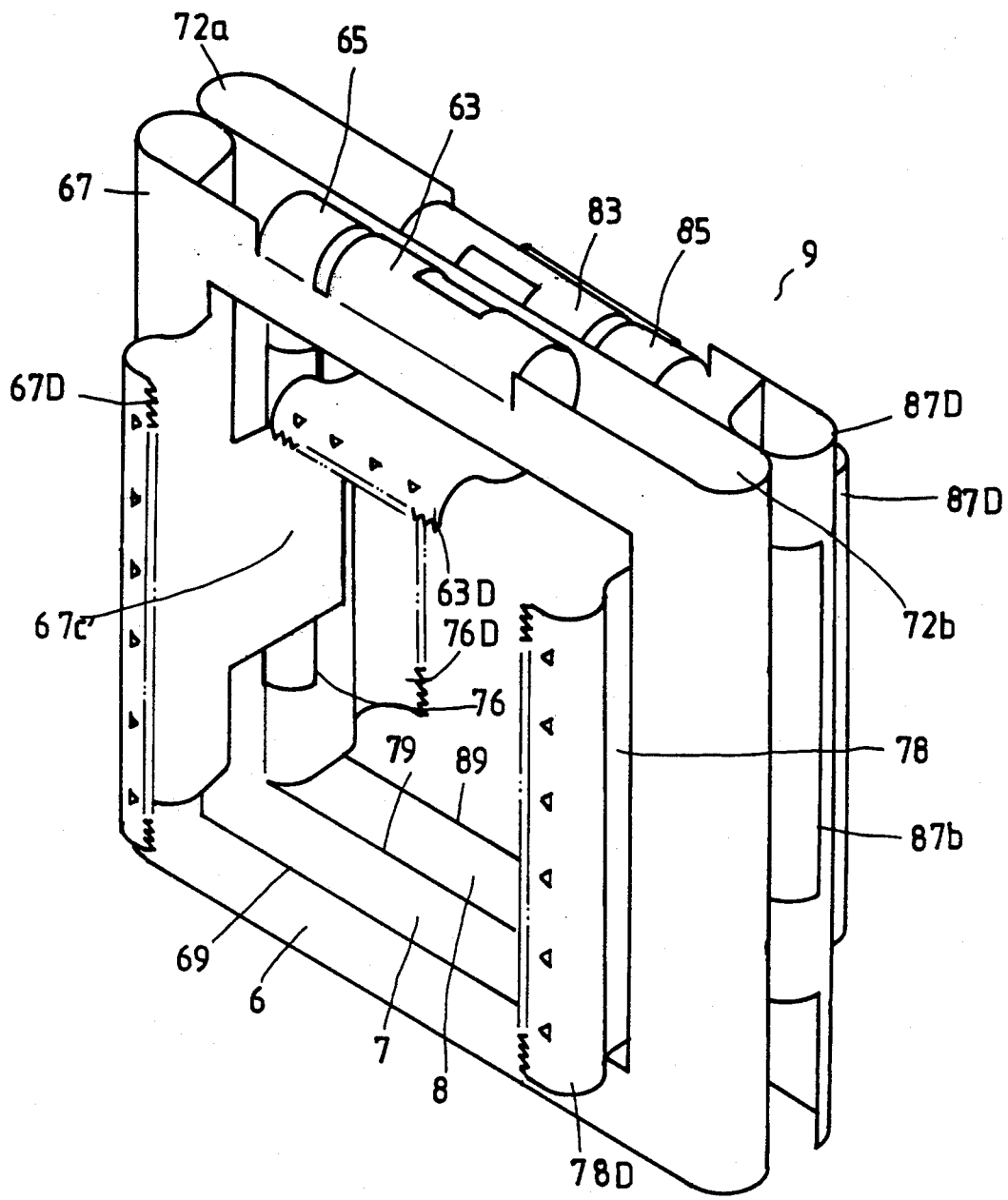
FIG. 7 is a perspective view of the spring retainer.

As indicated in FIGS. 6 and 7, the spring retainer 9 is made from a spring plate of suitable thickness in suitable size through the process of punching and bending and formed into an intermediate section 7 and two opposite side sections 6,8, having openings 79,68,89 aligned through the intermediate section 7 and the side sections 6,8, and locating spring leaves 63,67,76,78,83,87 and prongs 65,86 respectively formed on the side sections 6,8 and the intermediate section 7, wherein the opposite side sections 6,8 are respectively extended from the intermediate section 7 through a respective belly 72a or 72b and curved outwards and then inwards.

Figure 8:
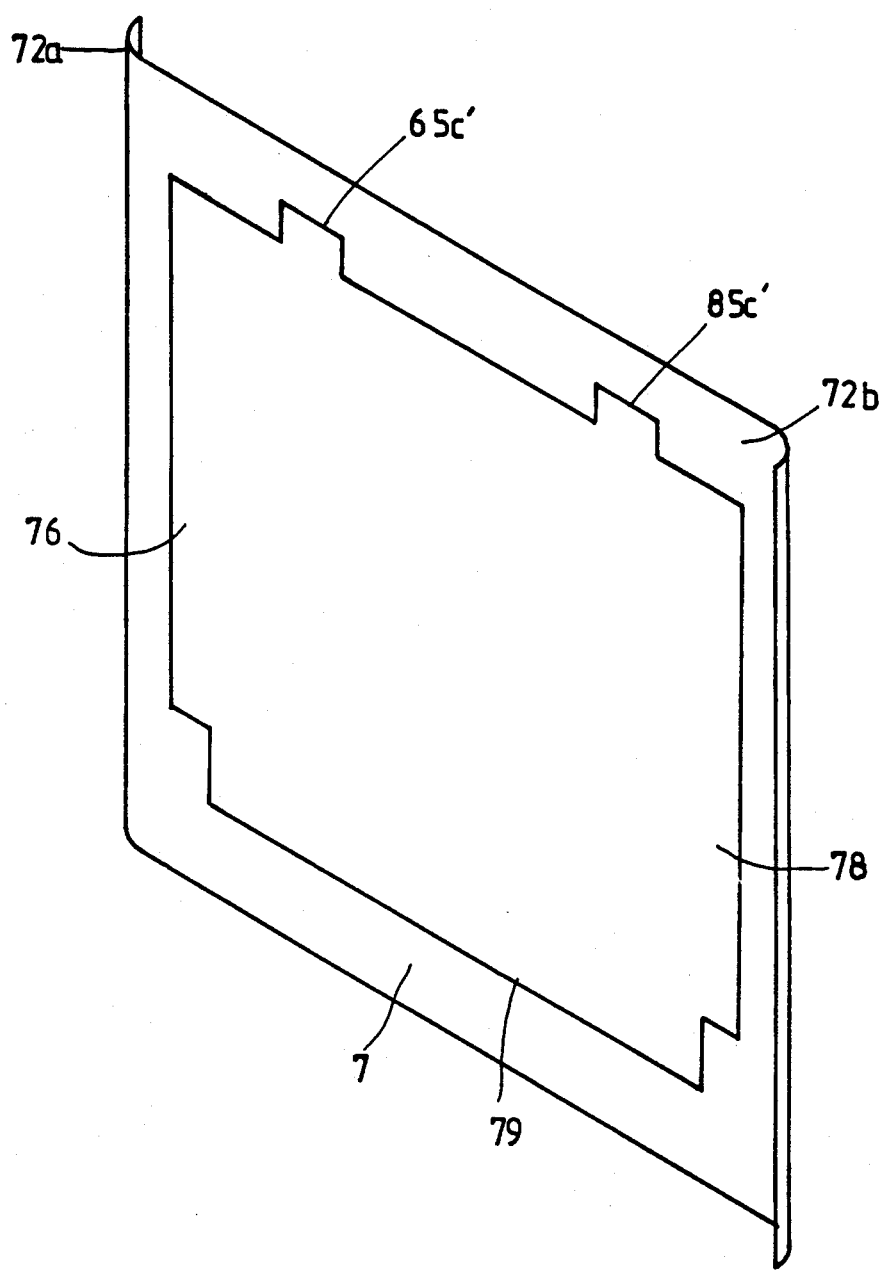
FIG. 8 is a plan view of the intermediate section of the spring retainer.
Figure 9:
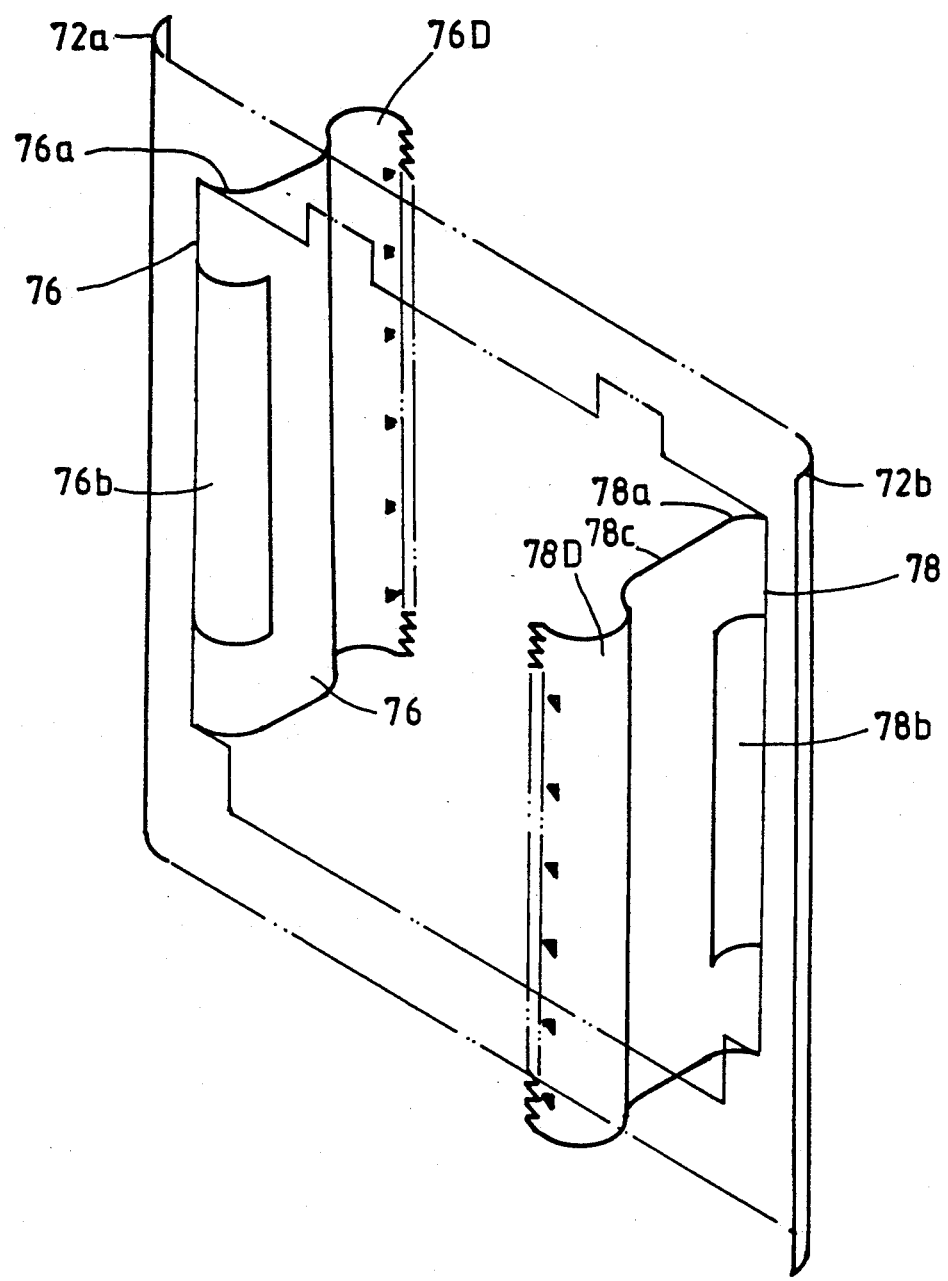
FIG. 9 is an elevational view of the intermediate section showing the structure of the locating spring leaves on the bellies thereof.

Referring to FIGS. 8, 9 and FIGS. 6 and 7 again, the intermediate section 7 has two notches 65c', 85c' spaced at an upper level for moving the prongs 65,86. The locating spring leaf 76 or 78 on either end of the intermediate section 7 has a slot 76b or 78b on a respective hinged portion 76a or 78a connected to either belly 72a or 72b. Because of the hinged portion 76a or 78a, the locating spring leaf 76 or 78 can be turned on either belly 72a or 72b like a swinging door. The arrangement of the slot 76b or 78b on the hinged portion 76a or 78a makes the locating spring leaf 76 or 78 be able to return to its former shape after being pulled. When installed, the toothed edge 76D or 78D of the locating spring leaf 76 or 78 extends outwards through the opening 68 or 89 on either side section 6 or 8. As the locating spring leaves 76,78 are respective spread out like a fan upon the insertion of the rod members to be tied, the toothed edges 76D, 78D respectively engage the rod members to hold them down. The locating spring leaves 76,78 each has a projecting portion 76C or 78C retained with a projecting portion 67C' or 87C' on the locating spring leaf 67 or 87 of either side section 6 or 8. If the spring retainer 9 is made from a spring plate of certain thickness, the side sections 6,8 may become difficult to return to their former shapes after being pulled, and therefore slots or gaps shall be made on the bellies 72a,72b of the intermediate section 7 for permitting the side sections 6,8 to automatically return to their former shapes after being pulled.

Referring to FIG. 10 and FIGS. 6 and 7 again, each side sections 6 or 8 has a slot 63b or 73b on a respective hinged portion 63a or 83a connected to either belly 72a or 72b. As indicated, the locating spring leaf 63 or 83 of either side section 6 or 8 is terminated into a toothed edge 63D or 83D respectively inserted through the opening 69 or 89 on the respective side section 6 or 8 in reversed directions. As the side sections 6,8 were spread out like a fan, the locating spring leaves 63,83 are turned on the hinged portions 63a,83a respectively for permitting the toothed edges 63D,83D to engage the rod members inserted therein. Once the rod members were removed from the mechanical coupling device, the slots 63b,83b on the hinged portions 63a,83a permit the locating spring leaves 63,83 to return to their former shapes automatically.

Figure 11A:
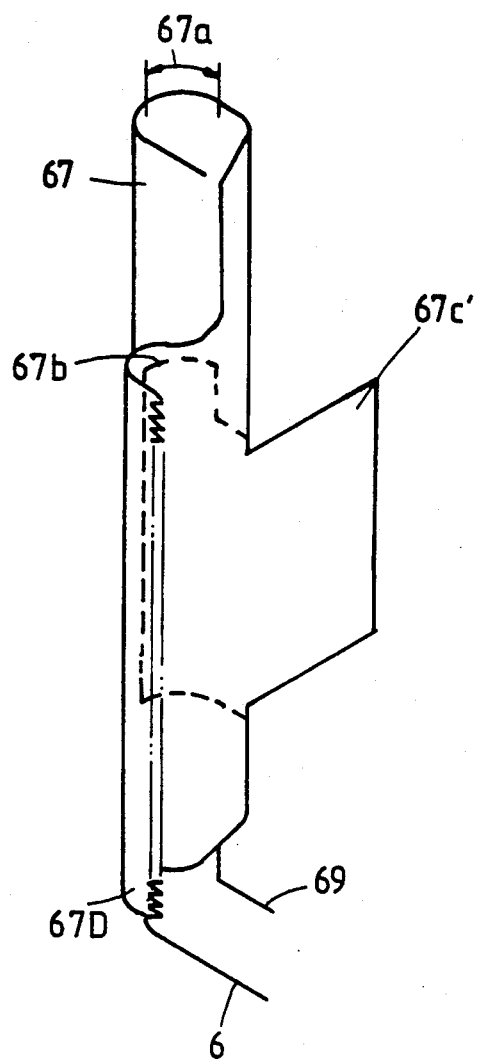
FIGS. 11a and b are perspectives view showing the structure of the hinged portions on the locating spring leaves of the side sections.
Figure 11B:
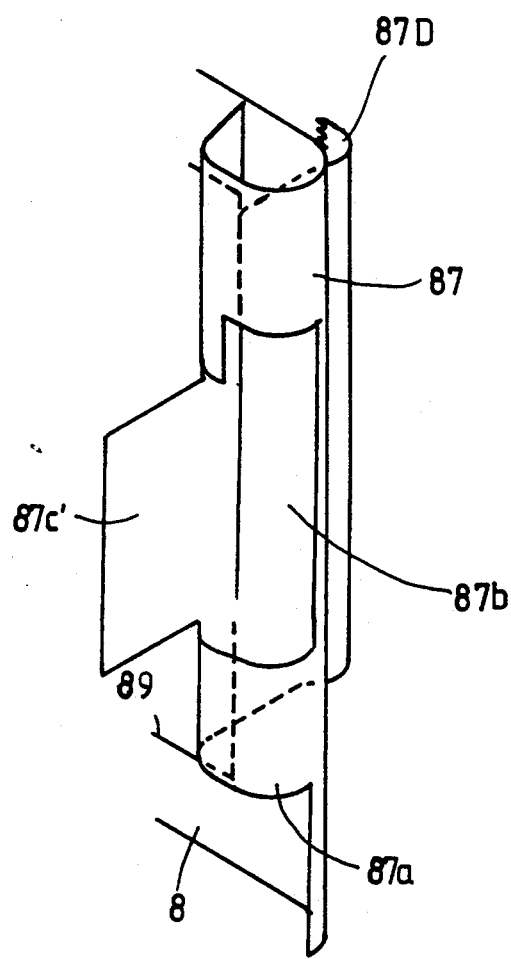
Figure 12:
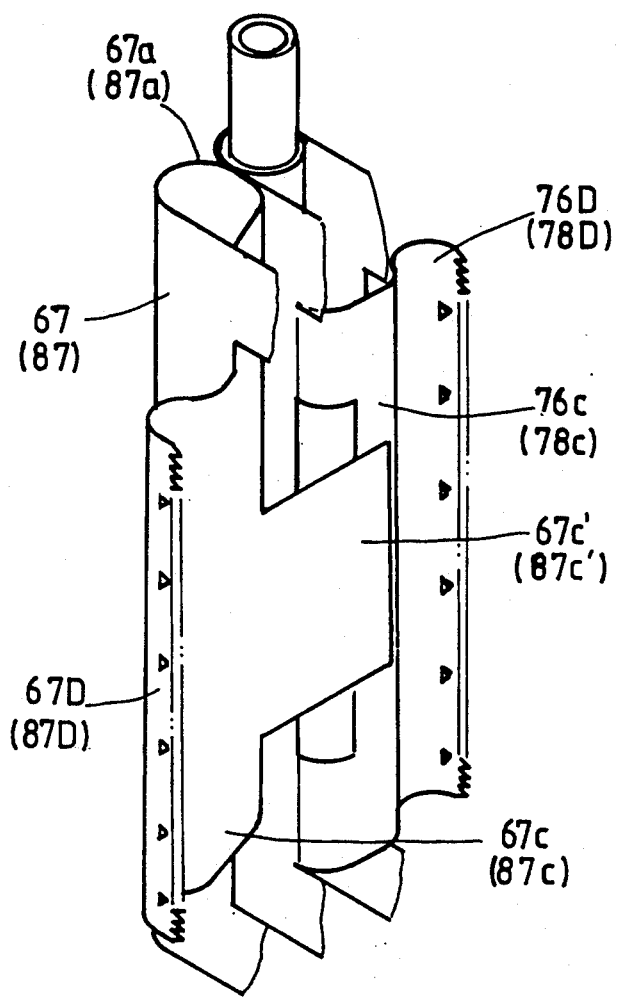
FIG. 12 is a partly cut-off view of the spring retainer showing the projecting portion on either side section pressed on the projecting portions on the respective belly.

Referring to FIGS. 11 and 12, while making the slots 67b,87b on the locating spring leaves 67,87 of the side sections 6,8, the parts 67c,87c been cut are punched into the aforesaid projecting portions 67c',87c' symmetrically turned toward two reversed directions matching with the projecting portions 76c,78c of the locating spring leaves 76,78 on the bellies 72a,72b. Because the locating spring leaves 76,78 are to be respectively turned inwards or outwards on the bellies 72a,72b around the rod members by the hinged portions 76a,78b like the motion of a fan, the projecting portions 67c',87c' on the locating spring leaves 67,87 are respectively extended over the projecting portions 76c,78c on the locating spring leaves 76,78 of the bellies 72a,72b, and therefore the projecting portions 76c,78c become stably retained with the projecting portions 67c',87c'.

Referring to FIGS. 6,7 and 10 again, the prongs 65,85 are respectively formed on the side sections 6,8 at suitable locations between the locating spring leaves 63,67,83,87. Each prong 65 or 85 has a hinged portion 65a or 85a on which it turned inwards or outwards.

Figure 13A:
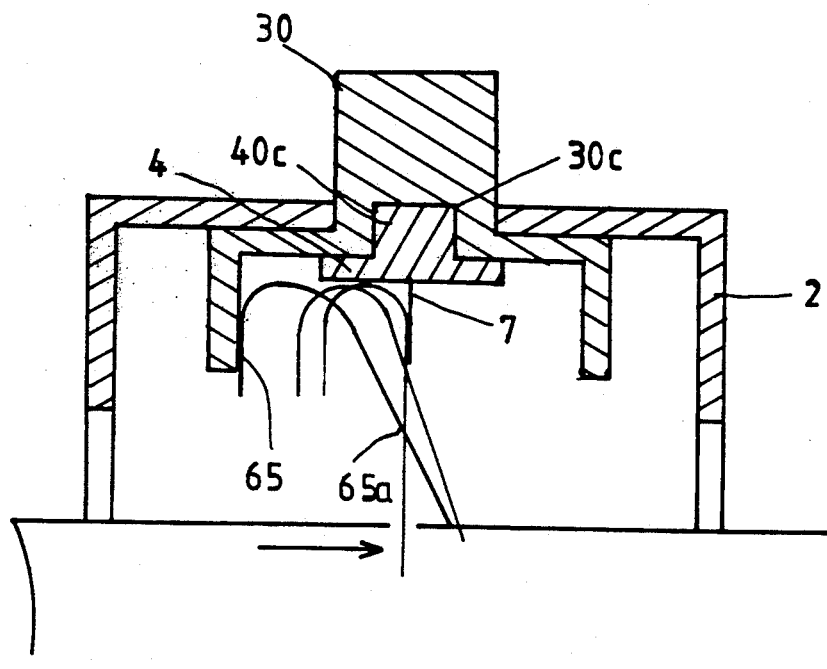
FIGS. 13a and b are a sectional front view in an enlarged scale showing the prong moved by the rod member to spread out the respective locating spring leaves.
Figure 13B:
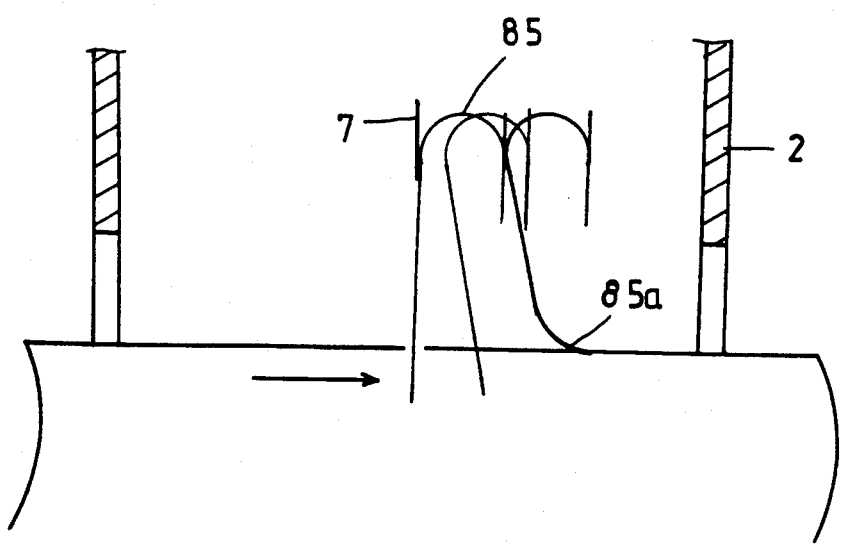
Figure 14:
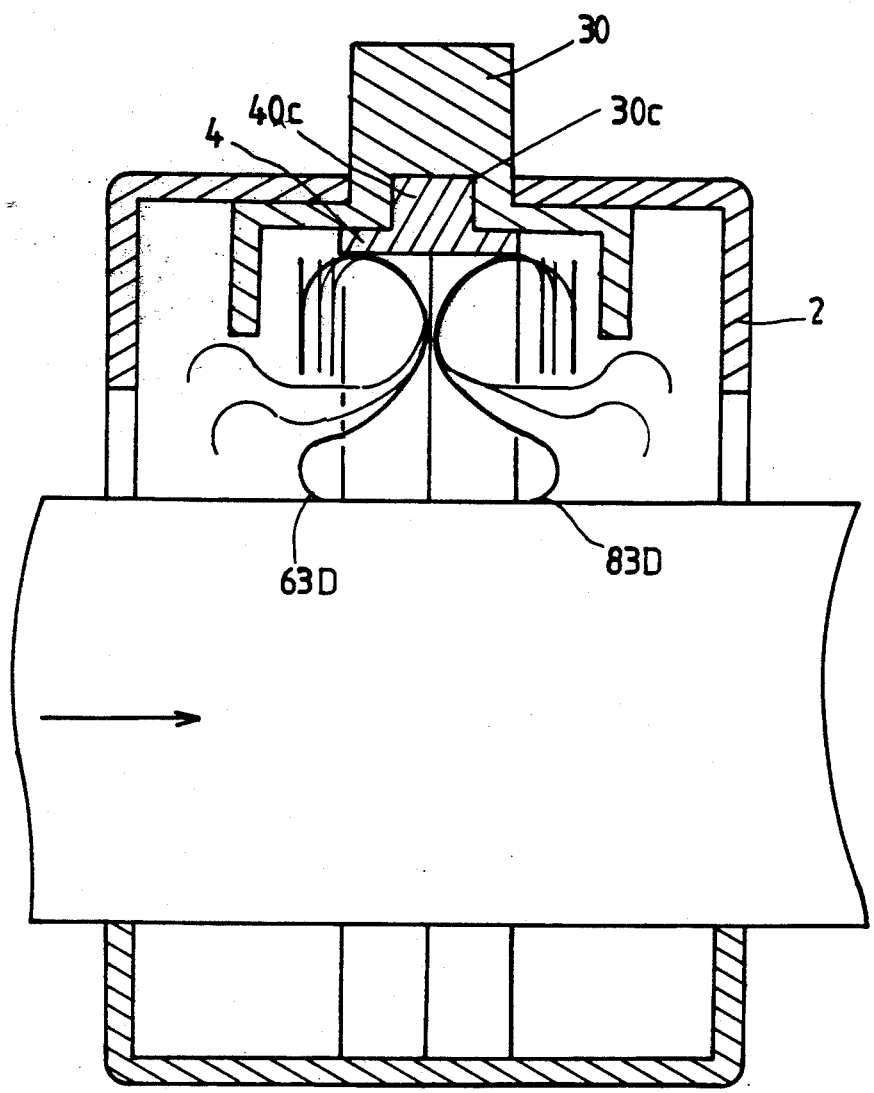
FIG. 14 is a sectional side view in an enlarged scale showing the toothed edges of the locating spring leaves of the side sections been spread out to engage the rod members.
Figure 15:
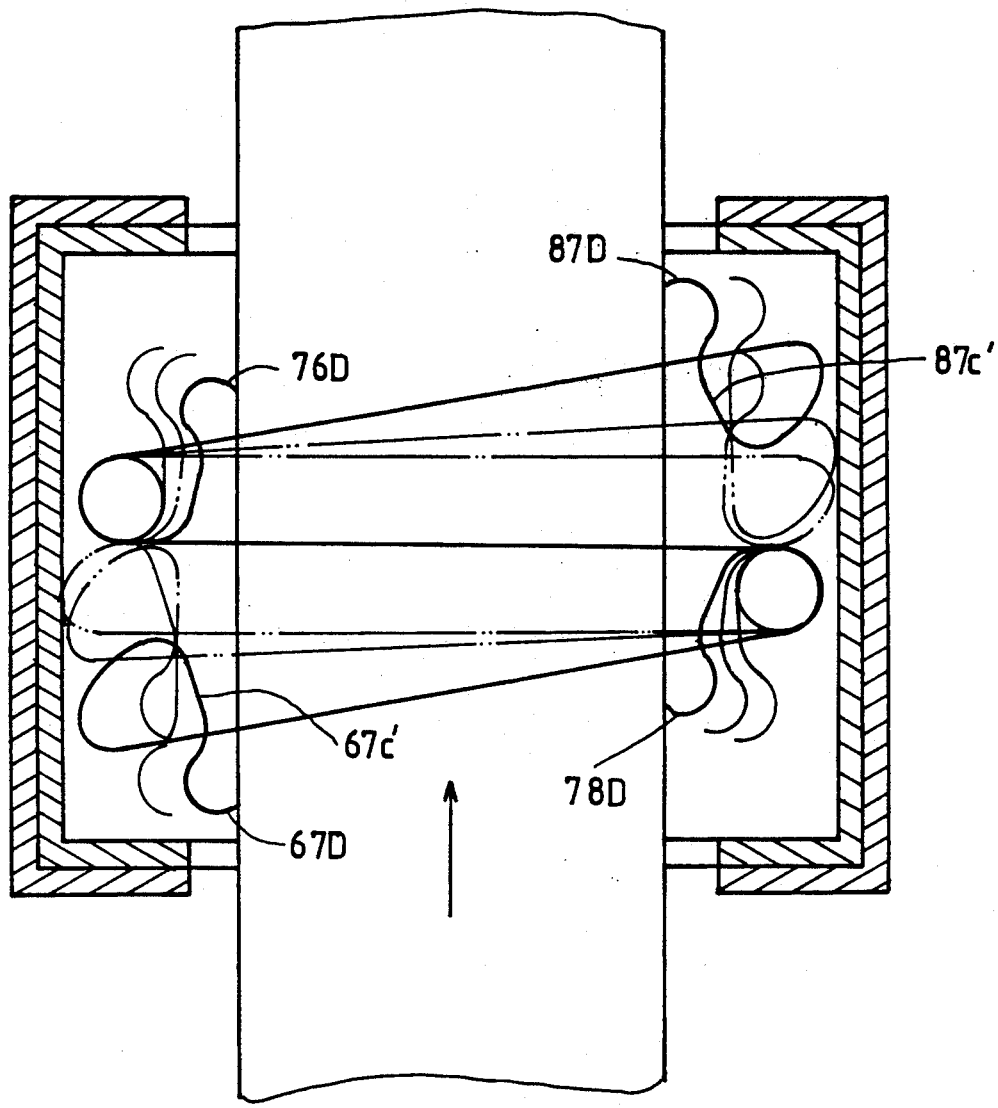
FIG. 15 is a sectional top view in an enlarged scale showing the toothed edges of the locating spring leaves of the side sections and the intermediate section of the spring retainer been respectively spread out to engage the rod members.
Figure 16:
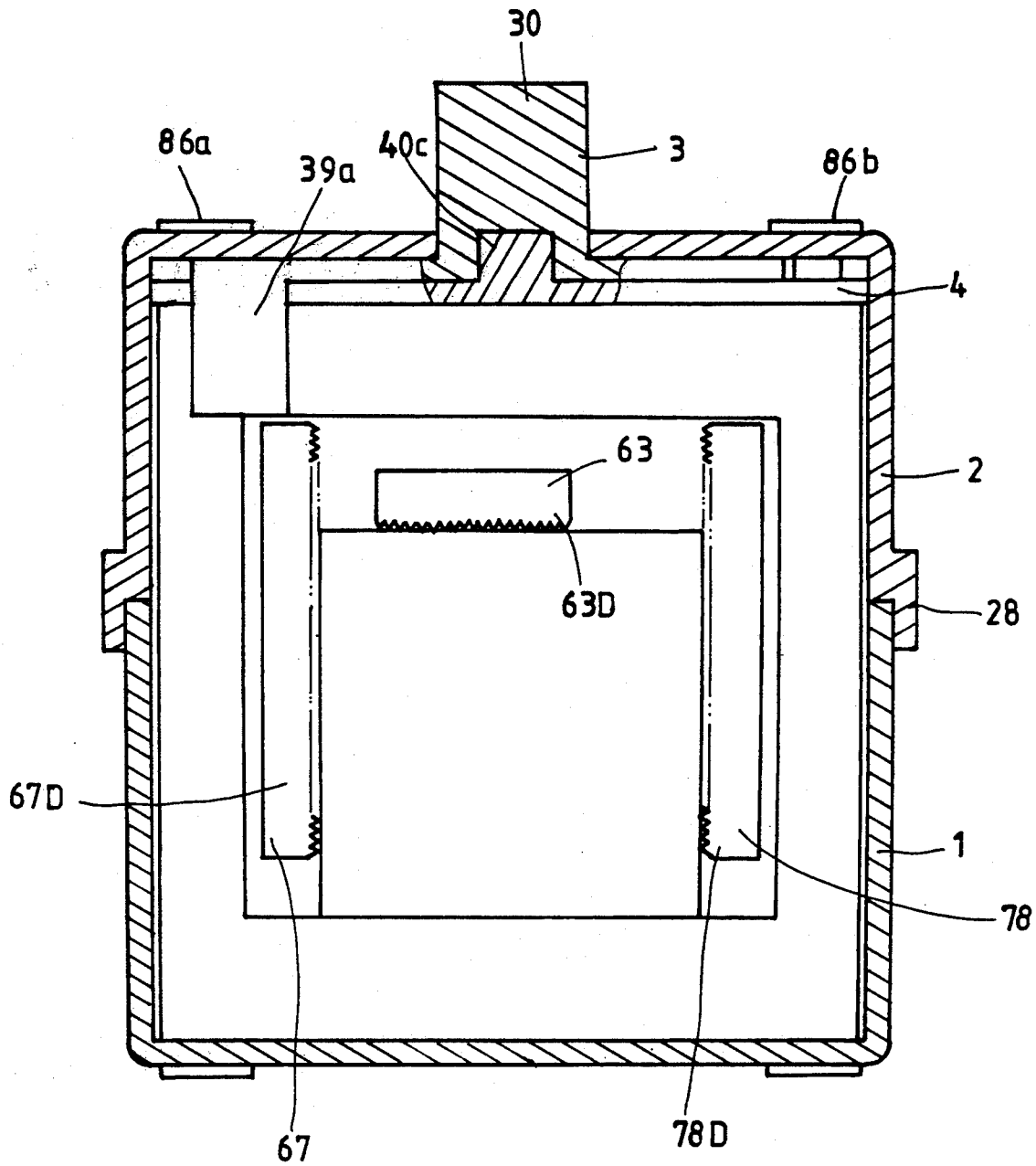
FIG. 16 is a sectional front view in an enlarged scale showing a square rod member engaged by the toothed edges of the locating spring leaves of the side sections and the intermediate section of the spring retainer.
Figure 17:
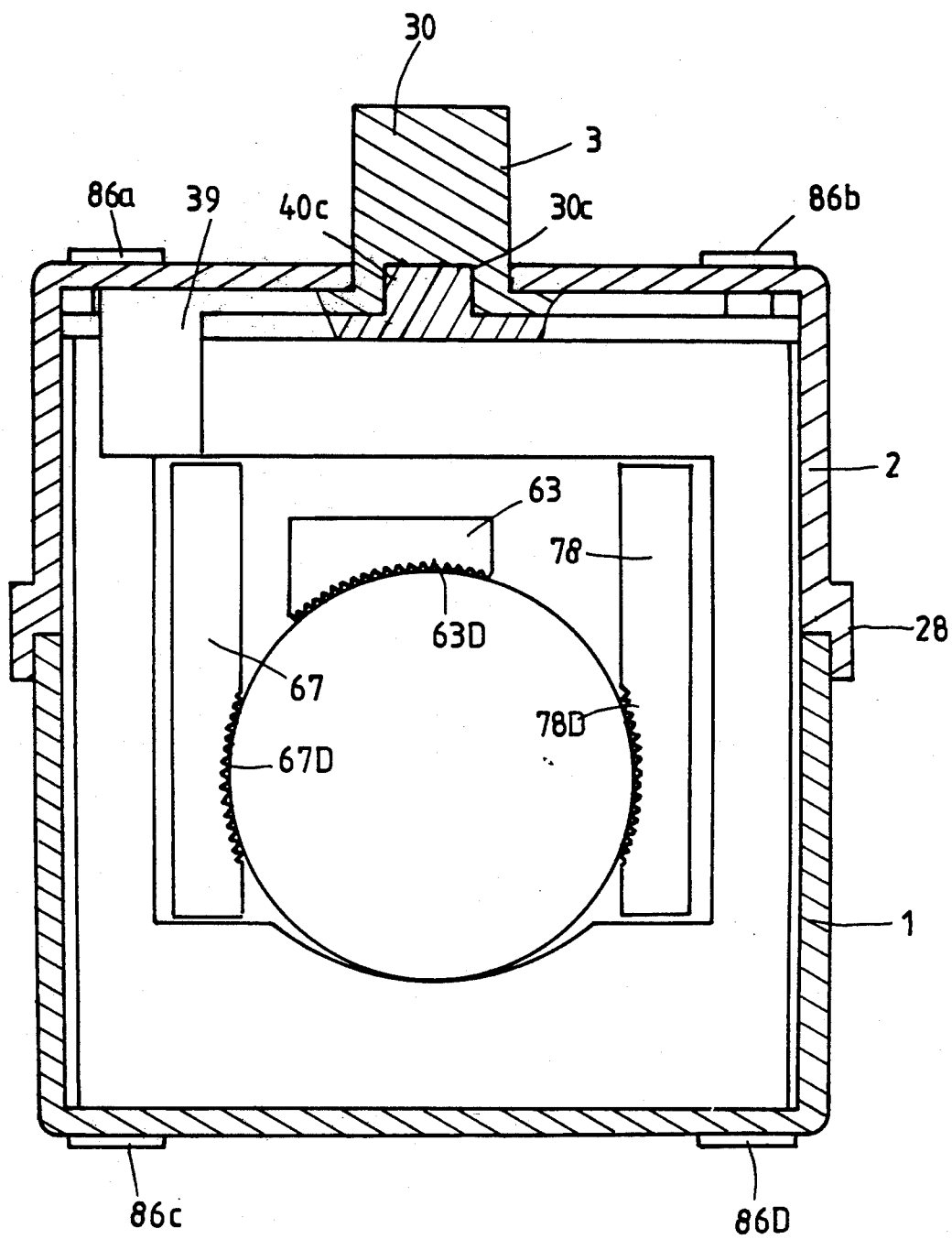
FIG. 17 is a sectional front view in an enlarged scale showing a round rod member engaged by the toothed edges of the locating spring leaves of the side sections and the intermediate section of the spring retainer.
Figure 19:
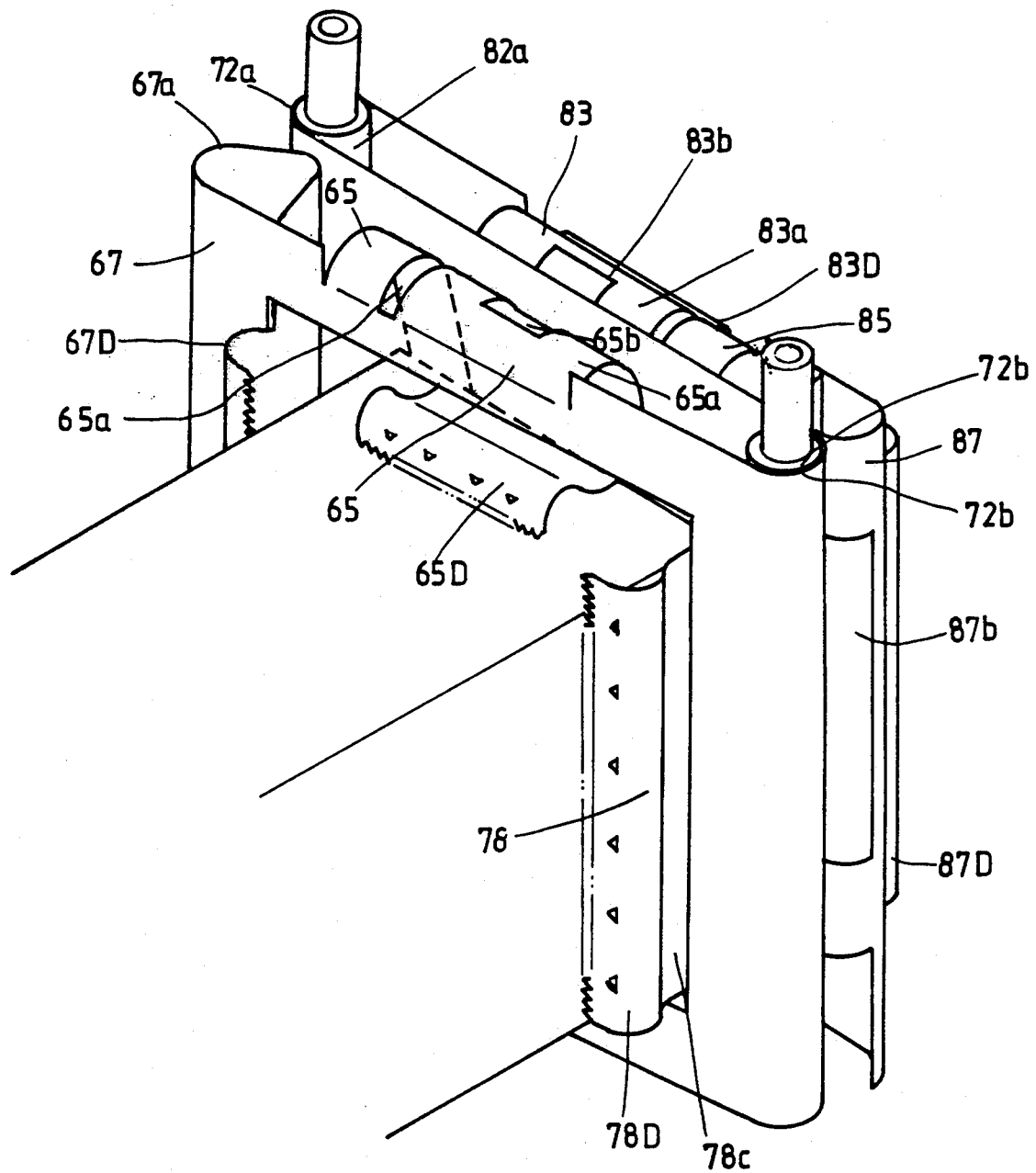
FIGS. 19, 20 and 21 are pictorial drawings showing the operation of the spring retainer as a rod member was inserted into the opening on the outer shell of the mechanical coupling device and the openings on the intermediate and side sections of the spring retainer.
Figure 20:
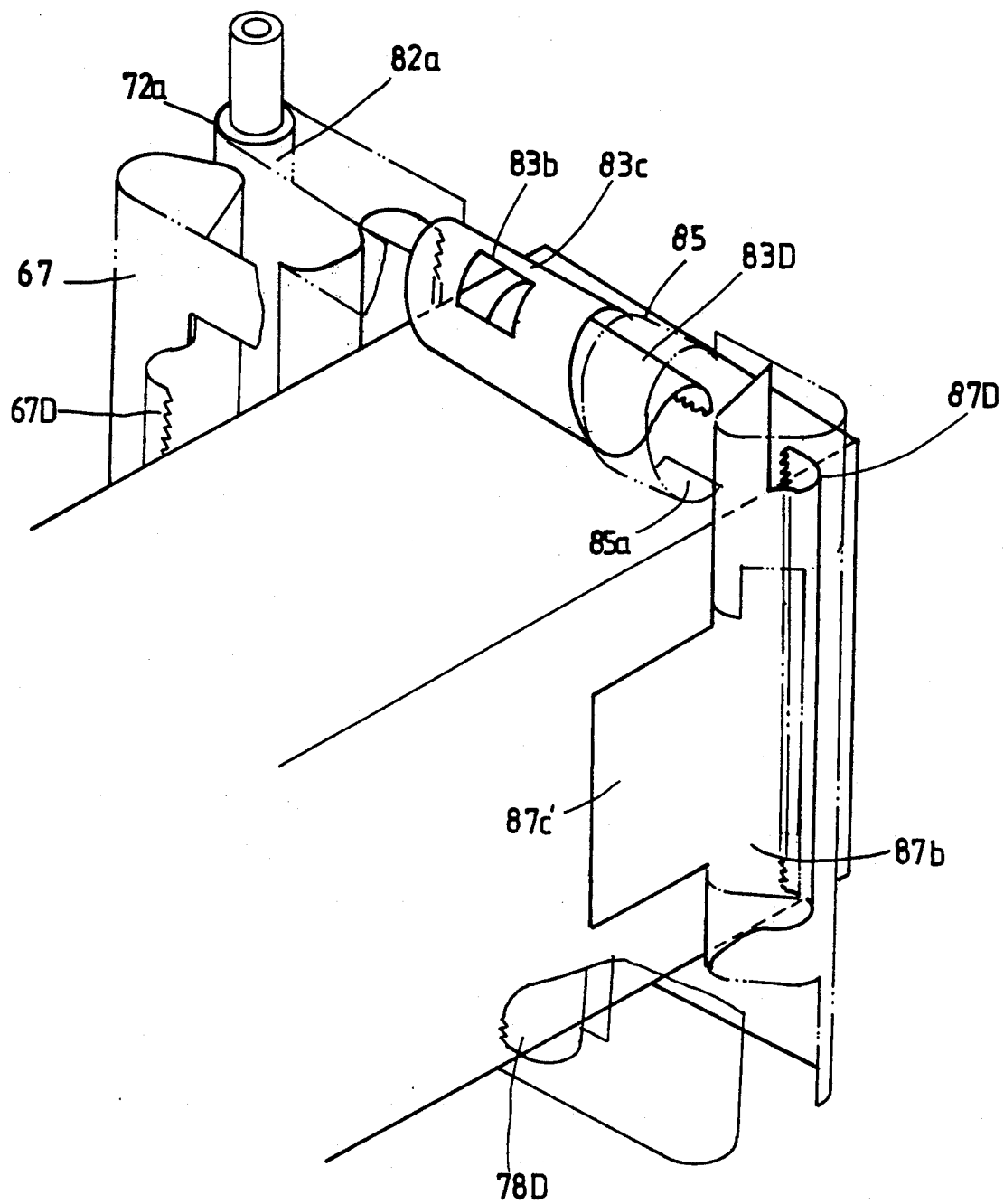
Figure 21:
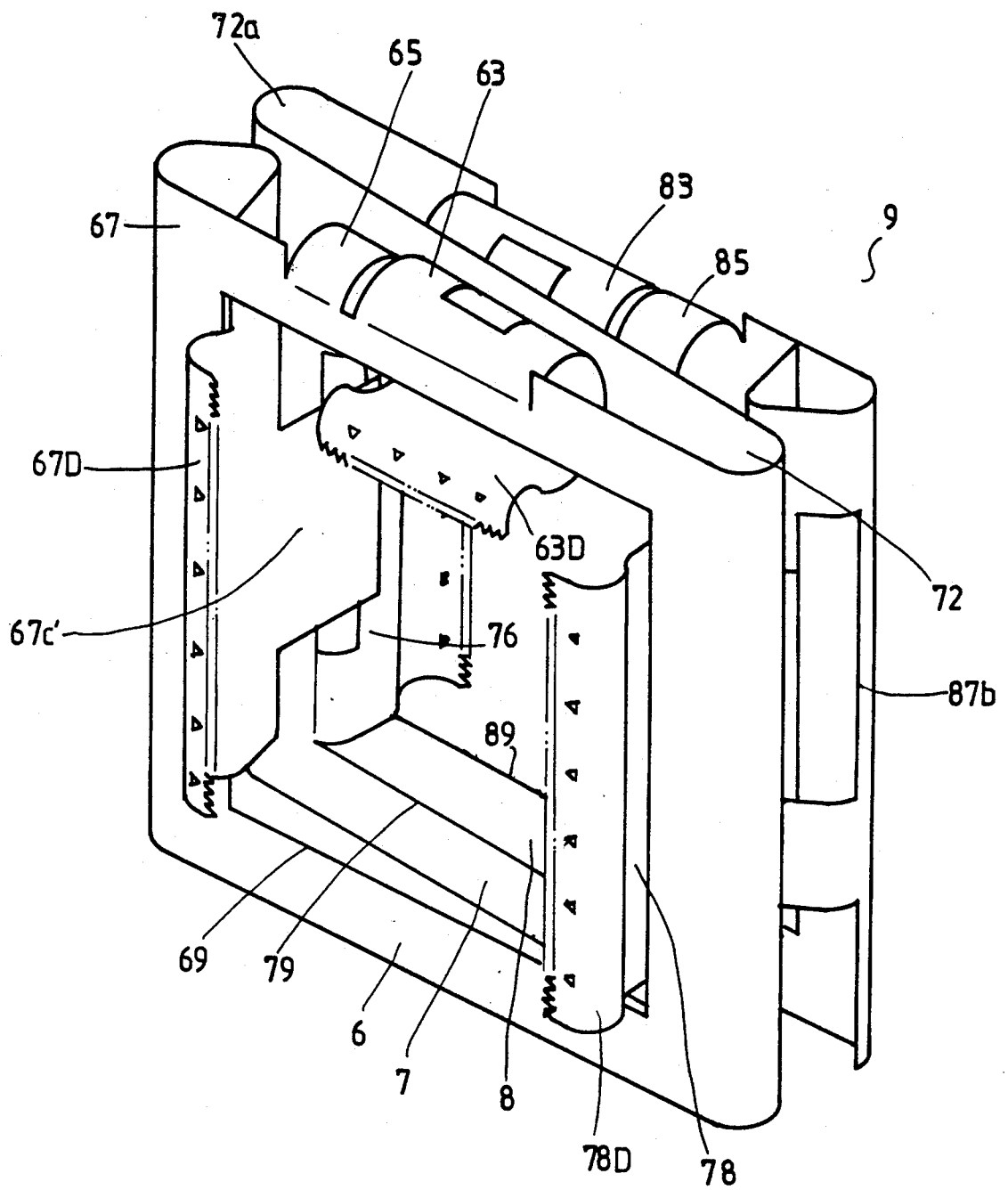

Referring to FIGS. 13, 14 and 19, as the rod member members to be tied are inserting into the openings 109,79,69,89, the prong 65 is firstly moved (like the motion of a lever, as the prong 65 is supported on the intermediate section 7 and the bearing plate 4) to push the side section 6 in separating the projecting portion 67c' of the locating spring leaf 67 from the projecting portion 76c of the locating spring leaf 76. On the opposite side, the prong 85 is moved to push the side section 8 in separating the projecting portion 87c' of the locating spring leaf 87 from the projecting portion 78c of the locating spring leaf 78. Therefore, the side sections 6,8 are turned to spread out the locating spring leaves 63,67,83,87,76,78 like a fan, causing the toothed edges 63S,67D,83D,87D,76D,78D to engage the rod members and the prongs 65,85 to irregularly curl up in holding down the rod members. As the actuating rods 36,38 of the driving device 3 are mounted on the side sections 6,8 at inner sides by the gaps 37a,37b, they can be turned to spread out the side sections 6,8 as the prongs 65,85 fail to work properly. As the operating axle 30 of the driving device 3 is turned with the hand by a screwdriver or spanner in the reversed direction, the driving rods 39a,39b are turned to contract the side sections 6,8, causing the locating spring leaves 63,67,83,87 to turn on the hinged portions 63a,67a,83a,87a in moving back the toothed edges 63D,67D,83D,87D from the rod members respectively, and at the same time, the projecting portions 67c',87c' of the bellies 72a,72b are gradually and respectively moved toward the projecting portions 76c,78c of the locating spring leaves 76,78 in turning the locating spring leaves 76,78 on the hinged portions 76a,78a, causing the toothed edges 76D,78D to be disengaged from from the rod members. When separated from the rod members, the projecting portions 67c',87c' are retained with the projecting portions 76c,78c, for permitting the rod members to be removed from the mechanical coupling device. Once the rod members were removed from the mechanical coupling device, the prongs 65,85 projects into the passage through the openings 79,69,89 again for next operation.

During the assembly process of the present invention, the two tie rods 82a,82b are respectively inserted through the bellies 72a,72b with the bottom extension rods 86c,86D respectively inserted through the small holes 16c,16D on the casing 1, the bearing plate 4 is then mounted on the tie rods 82a,82b for permitting the top extension rods 86a,86b to insert through the small holes 46a,46b, and then the driving device 3 is mounted on the bearing plate 4 and covered by the top cover 2 for permitting the upright stub axle 40c to insert in the recessed axle hole 30c and the top extension rods 86a,86b to insert through the small holes 26a,26b on the top cover 2 via the corner cuts 341,342 and for permitting the operating axle 30 to be extended out of the top cover 2 through the center hole 20. When assembled, the top extension rods 86a,86b and the bottom extension rods 86c,86D are respectively hammered down to form a respective head for permitting the top cover 2 and the casing 1 to be tied down to the tie rods 82a,82b (see FIGS. 1, 2 and 3).

The operation of the present invention is outlined hereinafter with reference to the annexed drawings. As the rod members to be tied are inserted into the opening 109 from two opposite ends, one prong 65 is pushed by the rod member inserted at one side to move the respective side section 6 in separating the projecting portion 67c' from the projecting portion 76c, and the other prong 85 is pushed by the rod member inserted at an opposite side to move the respective side section 8 in separating the projecting portion 87c' from the projecting portion 78c. As the projecting portions 67c',87c' of the side sections 6,8 are respectively separated from the projecting portions 76c,78c, the side sections 6,8 extend out toward two reversed directions automatically by means of the effect of their springy material property, causing the locating spring leaves 63,67,83,87 of the side sections 6,8 and the locating spring leaves 76,78 of the intermediate section 7 to be turned on the respective hinged portions 63a,67a,83a,87a,76a,78a and then spread out like a fan, for permitting the toothed edges 63D,67D,76D,78D,83D,87D of the locating spring leaves 63,67,76,78,83,87 to engage the rod members. As the rod members are engaged by the toothed edges 63D,67D,76D,78D,83D,87D of the locating spring leaves 63,67,76,78,83,87, the hinged portions 63a,67a,7-6a,78a, 83a,87a, the locating spring leaves 63,67,76,78,83,87 and the bellies 72a,72b of the intermediate and side sections 7,6,8 are automatically adjusted into position to equilibrate the stress. At the same time, the prongs 65,85 are squeezed to curl up in holding down the rod members. As stated before, the operating axle 30 may be turned with the hand by a screwdriver or spanner to swivel the actuating rods 36,38 of the base plate 34 in spreading out the locating spring leaves 63,67,76,78,83,87 of the side sections 6,8 for permitting the toothed edges 63D,67D,76D,78D,83D,87D of the locating spring leaves 63,67,76,78,83,87 to engage the rod members.

The rod members can be released from the mechanical coupling device by turning the operation axle 30 with the hand through a screwdriver or spanner in the reversed direction. Turning the operating axle 30 in the reversed direction causes the driving device 3 to swivel on the upright stub axle 40c of the bearing plate 4, and therefore the side sections 6,8 of the spring retainer 9 are contracted by the driving rods 39a,39b in squeezing the hinged portions 63a,67a,83a,87a of the locating spring leaves 63,67,83,87. As the hinged portions 63a,67a,83a,87a of the locating spring leaves 63,67,83,87 are squeezed, the locating spring leaves 63,67,83,87 are forced to return to their former shapes for permitting the projecting portions 67c',87c' of the locating spring leaves 67,87 of the side sections 6,8 to press on the projecting portions 76c,78c of the locating spring leaves 76,78 of the intermediate section 7 in forcing the locating spring leaves 76,78 to turn on the respective hinged portions 76a,78a and return to their former shapes respectively. As the locating spring leaves 63,67,76,78,83,87 are returned to their former shapes respectively, the toothed edges 63D,67D,76D,78D,83D,87D are disengaged from the rod members, and the projecting portions 76c,78c of the locating spring leaves 76,78 of the intermediate section 7 become retained with the projecting portions 67c',87c' of the locating spring leaves 67,87 of the side sections 6,8. Therefore, the rod members can be removed from the mechanical coupling device easily. Once the rod members have been separated from the mechanical coupling device, the prongs 65,85 project into the passage through the openings 79,69,89 for next triggering.

Figure 18:
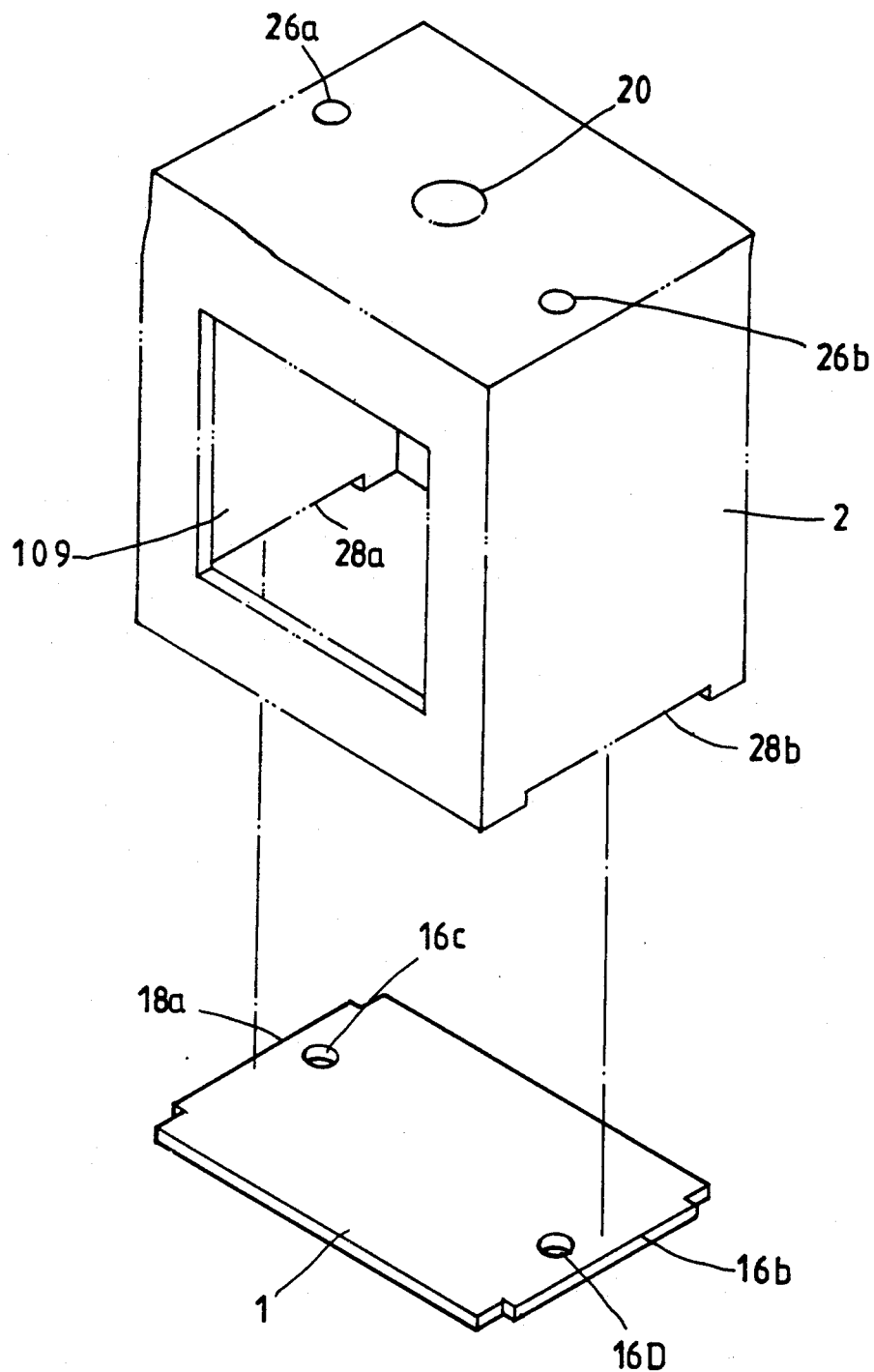
FIG. 18 illustrates an alternate form of the outer shell of the mechanical coupling device.

Various modifications and variations of the foregoing described invention are obvious to those skilled in the art. Such modifications and variations are intended to be within the scope of the present invention. For example, the opening 109 on the outer shell (formed of the casing 1 and the top cover 2) may be blocked at one end, or made in a square shape (see FIG. 1) or a circular shape (see FIG. 2), or formed of a square hole and a round hole (see FIG. 3). In another alternate form of the present invention, as shown in FIG. 18, the outer shell of the mechanical coupling device is formed of a covering (equivalent to the top cover 2 in FIGS. 1,2 and 3) covered on a flat bottom plate (equivalent to the casing 1 in FIGS. 1,2 and 3). Furthermore, the shape as well as the number of the tie rods may be changed. The projecting direction of the toothed edges and the projecting portions of the locating spring leaves of the side sections and the intermediate section may also be changed without affecting the operation of the spring retainer.

What is claimed is:

1. A mechanical coupling device comprising:
a housing comprising a top cover covered on a base, having a center hole and two spaced small top holes through a top wall thereof, two spaced small bottom holes through a bottom wall thereof respectively aligned with the small top holes, and at least one opening through a peripheral wall thereof;
a spring retainer made from a spring plate bent into a curved structure in a S-shaped cross section comprising an intermediate section having two opposite ends formed into two bellies, and two opposite side sections respectively extended outwards and then inwards from the two opposite bellies in reversed directions, said intermediate section and side sections each having an opening respectively in line with each of the at least one opening on said housing, said side sections and said bellies each having a locating spring leaf, said side sections each having a prong projected into the passage through said openings;
a bearing plate supported on said spring retainer inside said housing, having two small holes respectively aligned with the small top holes on said housing;
a driving device supported on said bearing plate, having an operating axle extended out of the center hole on said housing, two corner cuts on two diagonal corners thereof, two symmetrical driving rods and two symmetrical actuating rods perpendicularly extended downwards and respectively bridges over said side sections of said spring retainer;
two tie rods respectively attached to said bellies of said intermediate section of said spring retainer on an inner side, each tie rod having a thinner bottom extension rod inserted through either small bottom hole on said housing, and a thinner top extension rod inserted through either small hole on said bearing plate, either corner cut on said driving device and either small top hole on said housing, the top extension rod and the bottom extension rod of each tie rod being respectively hammered down into a head for permitting the top cover and the base of said housing to be held firmly fastened; and
wherein inserting a rod member or rod members into the at least one opening on said housing and the openings on said intermediate and side sections of said spring retainer causes said prongs to be moved to spread out said side sections for permitting the rod member or rod members to be held firmly fastened by said locating spring leaves.

2. The mechanical coupling device of claim 1 wherein rotating said operating axle in one direction causes said actuating rods to contract said spring retainer in moving back said side sections and disengaging said locating spring leaves from the rod member or rod members.

3. The mechanical coupling device of claim 1 wherein rotating said operating axle in the reversed direction causes said driving rods to spread out said side sections for permitting the rod member or rod members being inserted to be held firmly fastened by said locating spring leaves.

4. The mechanical coupling device of claim 1 wherein each locating spring leaf each has a hinged portion on which it is swiveled; each prong has a hinged portion on which it is swiveled.

5. The mechanical coupling device of claim 2 wherein the hinged portion on either locating spring leaf or prong has at least a narrow, elongated hole for permitting the locating spring leaf or prong to be able to return to a former shape after being pulled.

6. The mechanical coupling device of claim 1 wherein the locating spring leaves of said side sections each has a projecting portion pressed on a respective projecting portion on the locating spring leaf of either belly for permitting said side sections to be firmly retained in place.

7. The mechanical coupling device of claim 1 said locating spring leaves of said side sections and said bellies each having one end terminated into a toothed edge respectively engaged into the outside surface of the rod member or rod members being inserted into the at least one opening and the openings on said intermediate and side sections of said spring retainer.

8. The mechanical coupling device of claim 1 wherein said driving device is revolvably supported on an upright stub axle on said bearing plate and driven to contract or spread out said spring retainer.

9. The mechanical coupling device of claim 1 wherein said bearing plate is firmly fastened to said tie rods for permitting said driving device to be alternatively swiveled back and forth thereon.

10. The mechanical coupling device of claim 1 wherein said operating axle of said driving device has at least two opposite side planes outside said housing.

11. The mechanical coupling device of claim 1 wherein said operating axle of said driving device has a slotted head for turning with the hand by a screwdriver or the like.

12. The mechanical coupling device of claim 1 wherein said operating axle of said driving device has a polygonal hole through a top edge thereof for turning with the hand by a socket wrench or the like.

* * * * *